(12) United States Patent
Ito et al.

(10) Patent No.: US 12,546,669 B2
(45) Date of Patent: Feb. 10, 2026

(54) SEMICONDUCTOR DEVICE COUPLED TO A TEMPERTURE DETECTION ELEMENT FOR CORRECTION OF THE TEMPERTURE SIGNAL

(71) Applicant: FUJI ELECTRIC CO., LTD., Kawasaki (JP)

(72) Inventors: Yuichi Ito, Nagano (JP); Kazuhiro Matsunami, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 399 days.

(21) Appl. No.: 18/357,675

(22) Filed: Jul. 24, 2023

(65) Prior Publication Data

US 2024/0077366 A1 Mar. 7, 2024

(30) Foreign Application Priority Data

Sep. 1, 2022 (JP) ................................. 2022-139448

(51) Int. Cl.
| | |
|---|---|
| *G01K 7/24* | (2006.01) |
| *G01K 1/20* | (2006.01) |
| *G01K 7/42* | (2006.01) |
| *G01K 15/00* | (2006.01) |
| *H01L 21/66* | (2006.01) |

(52) U.S. Cl.
CPC ................. *G01K 7/24* (2013.01); *G01K 1/20* (2013.01); *G01K 7/42* (2013.01); *H01L 22/34* (2013.01); *G01K 15/005* (2013.01)

(58) Field of Classification Search
CPC .. G01K 1/20; G01K 7/24; G01K 7/42; G01K 15/00; G01K 15/005; G01K 15/007; H01L 22/34
See application file for complete search history.

(56) References Cited

U.S. PATENT DOCUMENTS

| | | | |
|---|---|---|---|
| 9,595,908 B2 | 3/2017 | Odaka et al. | |
| 10,190,918 B2 | 1/2019 | Higuchi et al. | |
| 10,823,693 B2 * | 11/2020 | Yoo ........................ | G01K 13/00 |

(Continued)

FOREIGN PATENT DOCUMENTS

| | | |
|---|---|---|
| JP | 3075303 B2 | 8/2000 |
| JP | 2006-324652 A | 11/2006 |

(Continued)

*Primary Examiner* — Randy W Gibson
(74) *Attorney, Agent, or Firm* — Rabin & Berdo, P.C.

(57) ABSTRACT

A semiconductor device includes an integrated circuit having a first resistor configuring a voltage divider circuit, a sensing resistor configured to measure a sheet resistance having a same attribute as that of the first resistor, a temperature detection circuit configured to detect a value of a first temperature, a storage circuit configured to store a table including first information for each of a plurality of values of the first temperatures, the first information corresponding to a sheet resistance of the first resistor obtained based on a result of measurement of the sensing resistor, and indicating a relationship between a second temperature and a divided voltage of the voltage divider circuit at the second temperature, and an arithmetic circuit configured to obtain the second temperature, based on the first information at the value of the first temperature detected by the temperature detection circuit and the divided voltage.

9 Claims, 10 Drawing Sheets

(56) References Cited

U.S. PATENT DOCUMENTS

| | | | | |
|---|---|---|---|---|
| 2010/0259313 | A1* | 10/2010 | Li | G01K 3/005 |
| | | | | 327/512 |
| 2016/0131535 | A1* | 5/2016 | Nakashimo | H02H 5/044 |
| | | | | 361/103 |
| 2019/0204253 | A1* | 7/2019 | Yoo | G01K 7/24 |
| 2021/0242179 | A1 | 8/2021 | Fujii | |

FOREIGN PATENT DOCUMENTS

| | | |
|---|---|---|
| JP | 4595696 B2 | 12/2010 |
| JP | 6107936 B2 | 4/2017 |
| JP | 6500579 B2 | 4/2019 |
| JP | 2021-125547 A | 8/2021 |

\* cited by examiner

| CORRECTION COEFFICIENT ($\rho s$ RATIO=1.15) | | THERMISTOR TEMPERATURE Tntc | | | | |
|---|---|---|---|---|---|---|
| | | T1 | ... | Tj | ... | Ty |
| CHIP TEMPERATURE Ti | T1 | TH_a(T1,T1)<br>TH_c(T1,T1) | ... | TH_a(T1,Tj)<br>TH_c(T1,Tj) | ... | TH_a(T1,Ty)<br>TH_c(T1,Ty) |
| | ⋮ | ... | ... | ... | ... | ... |
| | Ti | TH_a(Ti,T1)<br>TH_c(Ti,T1) | ... | TH_a(Ti,Tj)<br>TH_c(Ti,Tj) | ... | TH_a(Ti,Ty)<br>TH_c(Ti,Ty) |
| | ⋮ | ... | ... | ... | ... | ... |
| | Tx | TH_a(Tx,T1)<br>TH_c(Tx,T1) | ... | TH_a(Tx,Tj)<br>TH_c(Tx,Tj) | ... | TH_a(Tx,Ty)<br>TH_c(Tx,Ty) |

| CORRECTION COEFFICIENT ($\rho s$ RATIO=1.0) | | THERMISTOR TEMPERATURE Tntc | | | | |
|---|---|---|---|---|---|---|
| | | T1 | ... | Tj | ... | Ty |
| CHIP TEMPERATURE Ti | T1 | TH_a(T1,T1)<br>TH_c(T1,T1) | ... | TH_a(T1,Tj)<br>TH_c(T1,Tj) | ... | TH_a(T1,Ty)<br>TH_c(T1,Ty) |
| | ⋮ | ... | ... | ... | ... | ... |
| | Ti | TH_a(Ti,T1)<br>TH_c(Ti,T1) | ... | TH_a(Ti,Tj)<br>TH_c(Ti,Tj) | ... | TH_a(Ti,Ty)<br>TH_c(Ti,Ty) |
| | ⋮ | ... | ... | ... | ... | ... |
| | Tx | TH_a(Tx,T1)<br>TH_c(Tx,T1) | ... | TH_a(Tx,Tj)<br>TH_c(Tx,Tj) | ... | TH_a(Tx,Ty)<br>TH_c(Tx,Ty) |

| CORRECTION COEFFICIENT ($\rho s$ RATIO=0.85) | | THERMISTOR TEMPERATURE Tntc | | | | |
|---|---|---|---|---|---|---|
| | | T1 | ... | Tj | ... | Ty |
| CHIP TEMPERATURE Ti | T1 | TH_a(T1,T1)<br>TH_c(T1,T1) | ... | TH_a(T1,Tj)<br>TH_c(T1,Tj) | ... | TH_a(T1,Ty)<br>TH_c(T1,Ty) |
| | ⋮ | ... | ... | ... | ... | ... |
| | Ti | TH_a(Ti,T1)<br>TH_c(Ti,T1) | ... | TH_a(Ti,Tj)<br>TH_c(Ti,Tj) | ... | TH_a(Ti,Ty)<br>TH_c(Ti,Ty) |
| | ⋮ | ... | ... | ... | ... | ... |
| | Tx | TH_a(Tx,T1)<br>TH_c(Tx,T1) | ... | TH_a(Tx,Tj)<br>TH_c(Tx,Tj) | ... | TH_a(Tx,Ty)<br>TH_c(Tx,Ty) |

FIG. 6

SEMICONDUCTOR DEVICE COUPLED TO A TEMPERTURE DETECTION ELEMENT FOR CORRECTION OF THE TEMPERTURE SIGNAL

CROSS-REFERENCE TO RELATED APPLICATION

The present application claims priority pursuant to 35 U.S.C. § 119 from Japanese patent application number 2022-139448 filed on Sep. 1, 2022, the entire disclosure of which is hereby incorporated by reference herein.

BACKGROUND

Technical Field

The present disclosure relates to a semiconductor device.

Description of the Related Art

For example, there have been known semiconductor devices in which a temperature detection circuit (a diode and the like) is provided at a semiconductor substrate so as to be able to detect a temperature (for example, Japanese Patent Nos. 6500579, 4595696, 6107936, and 3075303, and Japanese Patent Application Publication Nos. 2006-324652 and 2021-125547).

When a temperature measurement target is away from the semiconductor device, a temperature can be detected such that a temperature detection element (for example, a thermistor) is arranged outside the semiconductor device (near the measurement target) and a signal obtained from the temperature detection element is processed in the semiconductor device. However, in this case, it is difficult to accurately detect the temperature due to the manufacturing variations of the temperature detection element and/or an element provided in the semiconductor device.

SUMMARY

An aspect of an embodiment of the present disclosure is a semiconductor device configured to be coupled to a temperature detection element, the semiconductor device comprising: an integrated circuit, including: a terminal through which the temperature detection element is coupled, a first resistor coupled to the terminal, such that the first resistor is coupled in series with the temperature detection element through the terminal to thereby configure a voltage divider circuit for providing a divided voltage, a sensing resistor configured to measure a sheet resistance, the sensing resistor having a same attribute as an attribute of the first resistor, a temperature detection circuit configured to detect a value of a first temperature that is a temperature of the integrated circuit, a storage circuit configured to store a table including first information for each of a plurality of values of the first temperature, the plurality of values including the value of the first temperature detected by the temperature detection circuit, the first information corresponding to the sheet resistance of the first resistor obtained from a result of measurement of the sensing resistor, and indicating a relationship between a second temperature, which is a temperature of the temperature detection element, and the divided voltage at the second temperature, and an arithmetic circuit configured to obtain the second temperature, based on the first information for the value of the first temperature detected by the temperature detection circuit and the divided voltage of the voltage divider circuit.

BRIEF DESCRIPTION OF THE DRAWINGS

FIG. 6 is an explanatory chart of a correction coefficient table.

DETAILED DESCRIPTION

At least following matters will become apparent from the descriptions of the present specification and the accompanying drawings.

Here, the same or similar constituents, members, and the like illustrated in the diagrams are given the same reference signs, and overlapping descriptions are omitted as needed. Further, in an embodiment of the present disclosure, the term "couple" means a state of being electrically coupled unless otherwise stated. Accordingly, the term "couple" includes a case where two components are coupled not only by wiring but also through a resistor, for example.

First Embodiment

<<Entire Configuration>>

Figure 1:
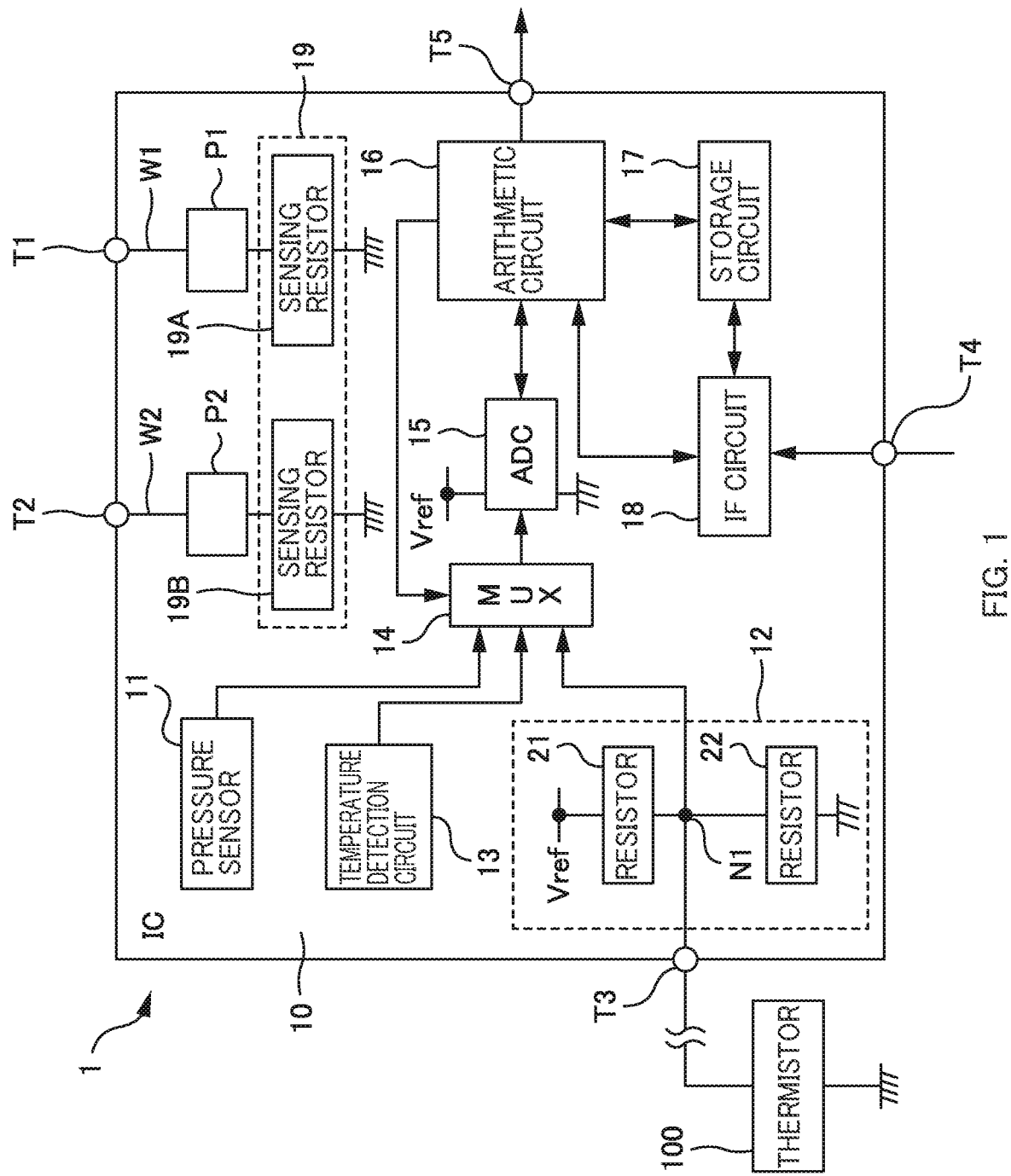
FIG. 1 is an explanatory diagram of an entire configuration including a semiconductor device 1 of a first embodiment.

FIG. 1 is an explanatory diagram of an entire configuration including a semiconductor device 1 of a first embodiment.

The semiconductor device 1 illustrated in FIG. 1 is capable of detecting a pressure and a temperature, and includes an integrated circuit (IC) 10 where many circuits and elements described later are formed on a substrate (not illustrated). As illustrated in FIG. 1, the integrated circuit 10 includes a pressure sensor 11, a resistor circuit 12, a temperature detection circuit 13, a multiplexer (hereinafter, referred to as MUX) 14, an analog-digital converter (hereinafter, referred to as ADC) 15, an arithmetic circuit 16, a storage circuit 17, an interface circuit (hereinafter, referred to as IF circuit) 18, a sheet resistance measurement pattern 19, pads P1 and P2, and terminals T1 to T5.

The terminal T1 is a terminal to which the pad P1 (described later) is coupled, and the pad P1 is to measure a resistance of a sensing resistor 19A (described later) in the sheet resistance measurement pattern 19. The terminal T1 and the pad P1 are coupled through a bonding wire W1.

The terminal T2 is a terminal to which the pad P2 (described later) is coupled, and the pad P2 is to measure a resistance of a sensing resistor 19B (described later) in the sheet resistance measurement pattern 19. The terminal T2 and the pad P2 are coupled through a bonding wire W2.

The terminal T3 is a terminal to which a node N1 (described later) of the resistor circuit 12 is coupled. Further, a thermistor 100 provided outside the semiconductor device 1 is coupled to the terminal T3. Moreover, the terminal T3 also functions as a terminal to measure each of the resistances of a resistor 21 and a resistor 22 of the resistor circuit 12, which will be described later. Note that the terminal T3 corresponds to a "terminal".

Note that the thermistor 100 is an element in which a resistance changes with a change in temperature, and is used as a sensor to detect a temperature. The thermistor 100 of an embodiment of the present disclosure is an NTC thermistor in which the resistance decreases with a rise in temperature. Note that the thermistor 100 corresponds to a "temperature detection element". Further, the resistor circuit 12 and the thermistor 100 correspond to a "voltage divider circuit". The thermistor 100 is arranged near a measurement target (for example, an engine of an automobile), and the temperature of the measurement target is conducted directly. Meanwhile, the semiconductor device 1 is arranged in a place away from the measurement target.

The terminal T4 is a terminal (input terminal) to receive a signal from the outside (for example, an ECU and/or a testing device) and the IF circuit 18 is coupled thereto.

The terminal T5 is a terminal (output terminal) to output a result of calculation from the arithmetic circuit 16.

The pressure sensor 11 is a sensor to output an electric signal corresponding to a pressure. An output (voltage) of the pressure sensor 11 is outputted to the MUX 14.

The resistor circuit 12 includes the resistor 21 and the resistor 22 coupled in series between a reference voltage Vref and a ground therein. Note that the resistor 21 corresponds to a "first resistor", and the resistor 22 corresponds to a "second resistor". The resistors 21 and 22 of an embodiment of the present disclosure are made of polysilicon. The resistors 21 and 22 made of polysilicon have a stable resistance value and are less affected by a bias voltage than a resistor made of a diffusion layer, for example. Further, the resistors 21 and 22 are in a strip shape having the same resistance widths (W) and the same resistance lengths (L), and are desirably designed such that the resistance value of one (for example, the resistor 21) is obtained as an integral multiple of the resistance value of the other (for example, the resistor 22).

Moreover, a coupling point between the resistor 21 and the resistor 22 (hereinafter, referred to as node N1 in some cases) is coupled to the terminal T3 and is coupled through the terminal T3 to the other end of the thermistor 100 having one end that is grounded.

The temperature detection circuit 13 is to detect a temperature (chip temperature Ti described later) in the integrated circuit 10. Note that, the chip temperature Ti corresponds to a "first temperature".

Figure 2:
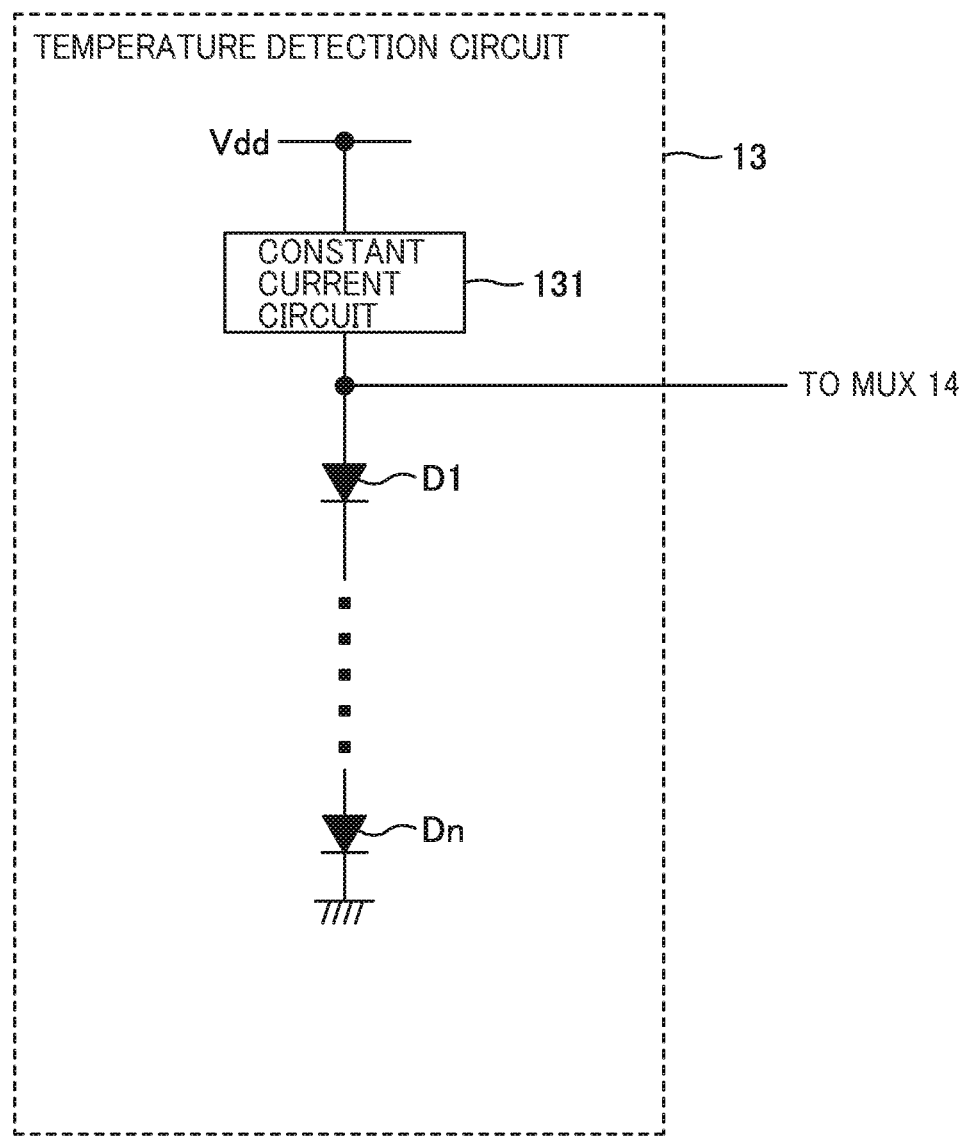
FIG. 2 is an explanatory diagram of a configuration example of a temperature detection circuit 13.

FIG. 2 is an explanatory diagram of a configuration example of the temperature detection circuit 13. As illustrated in FIG. 2, the temperature detection circuit 13 of an embodiment of the present disclosure includes a constant current circuit 131 and multiple (n) diodes D1 to Dn.

The constant current circuit 131 operates based on a power supply voltage Vdd, to thereby generate a constant current, and supplies the constant current to the diodes D1 to Dn.

The diodes D1 to Dn are coupled in series between the constant current circuit 131 and the ground. The diodes each have the temperature-dependent characteristics of a forward voltage Vf (for example, −2 mV/° C.) and can detect a temperature based on the temperature-dependent characteristics of the forward voltage Vf proportional to the number of n. Note that the number of the diodes may be one. However, it is possible to improve the temperature detection sensitivity if multiple diodes are provided as in an embodiment of the present disclosure.

For example, the MUX 14 is a circuit to select from among an output of the pressure sensor 11, an output of the temperature detection circuit 13, and a divided voltage of the resistor circuit 12 (voltage at the node N1), to thereby output a selected one to the ADC 15, in response to an instruction from the arithmetic circuit 16, which will be described later.

The ADC 15 is a circuit to convert an analog signal (voltage value) outputted from the MUX 14 into a digital signal. The ADC 15 of an embodiment of the present disclosure converts the analog signal into a 12-bit digital signal, for example.

The arithmetic circuit 16 is to perform overall control of the entire circuits provided in the integrated circuit 10, and, for example, executes a program stored in the storage circuit 17, to thereby implement various functions (for example, functions to perform a temperature detection process described later (FIG. 7)).

The storage circuit 17 is to store various programs and data. The storage circuit 17 of an embodiment of the present disclosure includes a non-volatile memory (for example, an EPROM, a flash memory, or the like). Data of the resistor and the like relating to the semiconductor device 1 are each stored in a dedicated address of the non-volatile memory, which will be described later in detail.

The IF circuit 18 is to transmit and receive various data and the like to and from the outside of the semiconductor device 1 (for example, the ECU and/or the testing device), the arithmetic circuit 16, and the storage circuit 17.

The sheet resistance measurement pattern 19 is a pattern for sheet resistance measurement having the same attribute as that of the resistor circuit 12 (resistors 21 and 22). Specifically, the sensing resistors 19A and 19B are made of polysilicon as with the resistors 21 and 22, and thus the sensing resistors 19A and 19B have the same attribute as that of the resistors 21 and 22. In the sheet resistance measurement pattern 19, multiple (in this case, two) sensing resistors (sensing resistors 19A and 19B) having different resistance lengths L and resistance widths W are arranged.

Further, the sensing resistor 19A is coupled to the pad P1, and the sensing resistor 19B is coupled to the pad P2. In wafer testing described later, it is possible to measure a resistance value of each of the sensing resistors 19A and 19B such that a probe of a measurement device is brought into contact with the pads P1 and P2 and the ground (for example, a not-illustrated ground pad or a dedicated terminal).

Based on a result of measurement of this sheet resistance measurement pattern 19 (sensing resistors 19A and 19B), it is possible to calculate a sheet resistance $\rho s$ ($\Omega/\square$) of the sensing resistors 19A and 19B and resistors 21 and 22 made of polysilicon. In this case, the number of the resistors included in the sheet resistance measurement pattern 19 is two; however, it is not limited thereto.

<<Resistor Circuit 12 and Thermistor 100>>

As described above, the thermistor 100 is provided outside the semiconductor device 1, and is coupled to the terminal T3 of the semiconductor device 1. Further, the node N1 of the coupling point between the resistor 21 and the resistor 22 in the resistor circuit 12 is coupled to the terminal T3. Thus, the thermistor 100 is coupled in series with the resistor 21, and is coupled in parallel with the resistor 22.

Then, the voltage at the node N1 is converted into a digital value by the ADC 15 through the MUX 14, to be transmitted to the arithmetic circuit 16.

As described above, in the thermistor 100, the resistance value changes with the temperature. As a result, the voltage at the node N1 changes between the reference voltage Vref and the ground (GND) according to the temperature of the thermistor 100.

When the temperature of the thermistor 100 increases and the resistance value of the thermistor 100 decreases, a divided voltage (voltage at the node N1) results in being close to the minimum (GND) because the thermistor 100 is coupled in series with the resistor 21.

Meanwhile, when the temperature of the thermistor 100 decreases and the resistance value of the thermistor 100 increases, the resistance value of the resistor 21 relatively decreases with respect to the resistance value of the thermistor 100. In this case, the divided voltage results in being close to the maximum (reference voltage Vref).

Thus, on the high temperature side, a variation in the resistance value of the thermistor 100 particularly affects the divided voltage, and on the low temperature side, a variation in the resistance value of the resistor 21 particularly affects the divided voltage.

Further, variations in the temperature characteristics of the resistance values of the resistor 21 and the resistor 22 formed in the integrated circuit 10 is also due to the manufacturing variations of a semiconductor wafer (width, length, depth, and impurity concentration of a resistance element).

As described above, the thermistor 100 is provided in a place away from the semiconductor device 1, and the temperature of the thermistor 100 and the temperature of the integrated circuit 10 (for example, the temperature detected by the temperature detection circuit 13) are different. Thus, it is impossible to grasp the resistance value (temperature) of the thermistor 100, without correctly grasping the resistance values of the resistors 21 and 22 when the temperature changes.

To deal with this, in an embodiment of the present disclosure, not only the resistance values of the resistors 21 and 22 but also a manufacturing state and the like of the semiconductor wafer is grasped, and the resistance values of the resistors 21 and 22 are corrected according to the manufacturing state and the temperature. This makes it possible to accurately detect the temperature of the thermistor 100 provided in a place away from the semiconductor device 1.

<<Process in Wafer Testing>>

Figure 3:
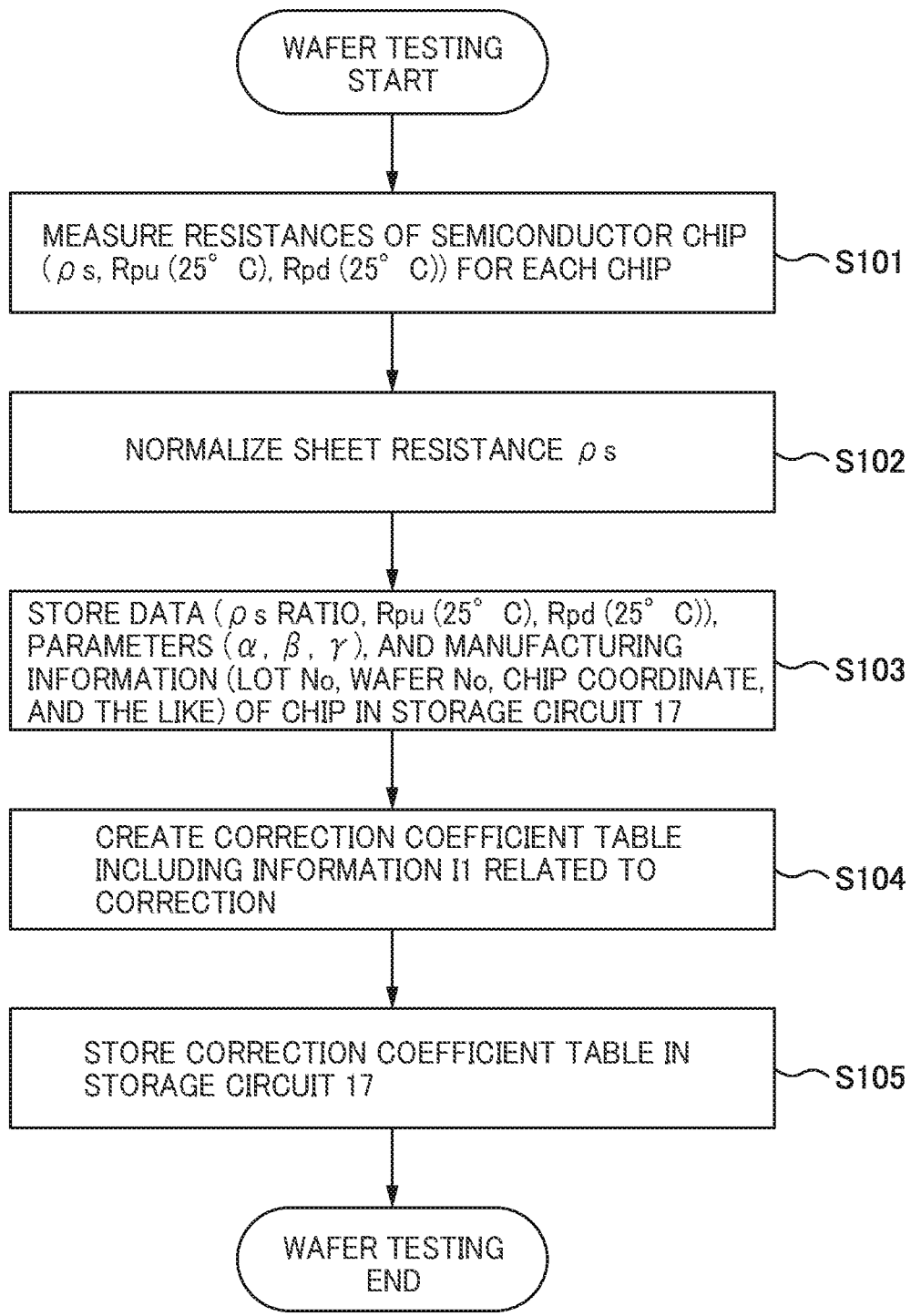
FIG. 3 is a flowchart illustrating a process in wafer testing.

FIG. 3 is a flowchart illustrating a process in the wafer testing. Note that multiple regions corresponding to the integrated circuits 10 (hereinafter, semiconductor chip regions) are formed in the wafer, and are cutting into semiconductor chips by dicing. Here, a description will be given assuming that the characteristics in each semiconductor chip region are measured in the wafer state (state before being cut into the semiconductor chips), and the semiconductor chip regions are the semiconductor chips (that is, corresponding to the integrated circuits 10) for the sake of convenience.

Note that, in an embodiment of the present disclosure, the measurement device (not illustrated) configured to measure the integrated circuit 10 executes processes from S101 to S105 of the flowchart in FIG. 3.

First, resistances of the semiconductor chip ($\rho s$, Rpu (25° C.), Rpd (25° C.)) are measured for each chip (S101).

Note that the sheet resistance $\rho s$ is obtained from the result of measurement of the sensing resistors 19A and 19B in the sheet resistance measurement pattern 19. In this measurement, the resistances of the sensing resistors 19A and 19B are measured such that the probe is brought in contact with the dedicated pads P1 and P2 and GND (the ground pad, the dedicated terminal, or the like). Then, the sheet resistance $\rho s$ ($\Omega/\square$) is obtained from the result.

Further, Rpu (25° C.) is the resistance value of the resistor 21 at a room temperature (in this case, 25° C.). The resistance value Rpu (25° C.) can be measured, for example, such that the probe is brought in contact with the terminal T3 (in actuality, a pad coupled to the terminal T3) to obtain a ground potential, to detect a current flowing when the reference voltage Vref is applied to the resistor 21.

Moreover, Rpd (25° C.) is the resistance value of the resistor 22 at the room temperature. The resistance value Rpd (25° C.) can be measured, for example, such that the probe is brought in contact with the terminal T3, to detect a current flowing through the resistor 22 when a predetermined voltage is applied.

Next, data of the measured sheet resistance $\rho s$ is normalized using a process-center value as a reference (S102). In the following descriptions, a variable ratio from the process-center of the sheet resistance $\rho s$ of each chip is also referred to as sheet resistance variable ratio (hereinafter, referred to as $\rho s$ ratio). Specifically, the $\rho s$ ratio can be obtained by the following expression (1):

$$\rho s \text{ ratio} = \rho s\text{meas}/\rho s\text{typ} \quad (1)$$

where $\rho s$meas is a measurement value of the sheet resistance $\rho s$, and $\rho s$typ is the center value of the sheet resistance $\rho s$.

Note that, in an embodiment of the present disclosure, the center value $\rho s$typ of the sheet resistance $\rho s$ is stored in a storage device (not illustrated) of the measurement device in advance.

Next, data such as the measurement data ($\rho s$ ratio, Rpu (25° C.), and Rpd (25° C.)), parameters ($\alpha$, $\beta$, and $\gamma$), and manufacturing information (lot No, wafer No, chip coordinates, and the like) of each chip are stored in the dedicated address of the storage circuit 17 through the IF circuit 18 (S103). Note that the parameters $\alpha$, $\beta$, and $\gamma$ are constants determined by the integrated circuit 10 (semiconductor chip). Further, the above-mentioned manufacturing information is information indicating manufacturing conditions of a chip, and corresponds to "second information".

Here, the resistance value Rpu of the resistor 21 and the resistance value Rpd of the resistor 22 depend on the sheet resistance $\rho s$. Further, the sheet resistance $\rho s$ varies in accordance with the temperature. In this case, assuming that a first-order temperature coefficient of one sheet resistance $\rho s$ is referred to as first-order coefficient tc1, the first-order coefficient tc1 can be expressed by the following expression (2) by using the parameters $\alpha$, $\beta$, and $\gamma$ and the $\rho s$ ratio:

$$tc1 = \alpha \times (\rho s \text{ ratio})2 + \beta \times (\rho s \text{ ratio}) + \gamma \quad (2).$$

Figure 4:
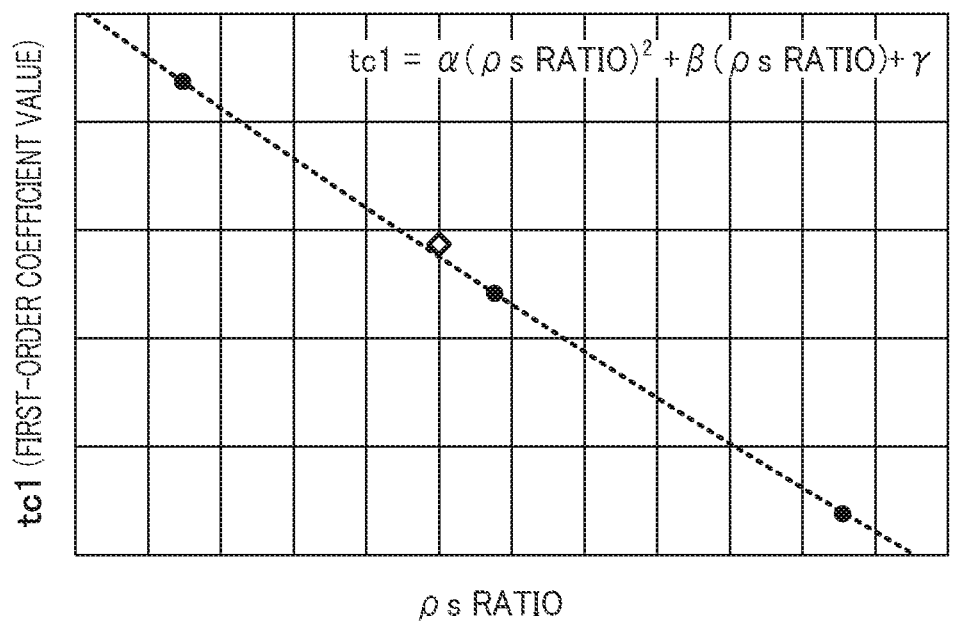
FIG. 4 is a chart illustrating an example of a relationship between a first-order coefficient tc1 and a sheet resistance variable ratio (ρs ratio).

FIG. 4 is a chart illustrating an example of a relationship between the first-order coefficient tc1 and the sheet resistance variable ratio ($\rho s$ ratio). The horizontal axis (x) indicates the $\rho s$ ratio, and the vertical axis (y) indicates the first-order coefficient tc1. Here, fitting is performed by actual measurement at three points; however, it is not limited thereto, and fitting may be performed based on two points, for example. Further, a diamond shape (◇) in FIG. 4 indicates a value when the ρs ratio is 1.

Further, the resistance value Rpu of the resistor 21 and the resistance value Rpd of the resistor 22 can be expressed by the following expressions (3) and (4), respectively, when the chip temperature is Ti:

$$Rpu(Ti)=Rpu(25°\ C.)\times\{tc1\times(Ti-25)+1\} \quad (3);$$

and $$Rpd(Ti)=Rpd(25°\ C.)\times\{tc1\times(Ti-25)+1\} \quad (4).$$

Each of Rpu (25° C.) and Ppd (25° C.) in the expressions (3) and (4) is a theoretical value at 25° C. when the sheet resistance ρs is a reference value. Accordingly, it is possible to calculate the resistance values Rpu and Rpd of the resistors 21 and 22 at the chip temperature Ti by using the expressions (3) and (4).

Note that, in an embodiment of the present disclosure, Rpu and Rpd are obtained by first-order approximation using the first-order coefficient tc1 with respect to 25° C. reference; however, it is not limited thereto and, for example, Rpu and Rpd may be obtained by second-order approximation by further using a second-order coefficient.

Next, a correction coefficient table is created, which includes information on the temperature correction based on a theoretical value (a theoretical divided voltage TH_a, a theoretical temperature TH_b, and a slope TH_c) (S104). It is assumed, in an embodiment of the present disclosure, that the measurement device outside the integrated circuit 10 creates the correction coefficient table; however, it is not limited thereto, and the arithmetic circuit 16 may create the correction coefficient table. Further, hereinafter, the theoretical divided voltage TH_a, the theoretical temperature TH_b, and the slope TH_c may be simply referred to as TH_a, TH_b, and TH_c.

The theoretical divided voltage TH_a is a theoretical value of a divided voltage obtained from a resistance value Rntc of the thermistor 100, the resistance value Rpu of the resistor 21, and the resistance value Rpd of the resistor 22 and can be obtained by the following expression (5):

$$TH\_a=Rpd\times Rntc/(Rpu\times Rntc+Rpu\times Rpd+Rpd\times Rntc) \quad (5).$$

In this case, Rpu and Rpd are the resistance values of the resistors 21 and 22 at the chip temperature Ti and are obtained by the expressions (3) and (4). Further, Rntc is the resistance value of the thermistor 100 at a thermistor temperature Tntc. Note that the theoretical divided voltage TH_a is converted into a 12-bit digital value.

The theoretical temperature TH_b is a theoretical value of the temperature of the thermistor 100, and is a value obtained by converting into a digital value corresponding to a resolution of the ADC 15 (in this case, 12 bits) such that a predetermined temperature range (for example, −40° C. to 200° C.) is positive. Note that the temperature of the thermistor 100 (thermistor temperature Tntc) corresponds to a "second temperature".

The slope TH_c is a coefficient to interpolate the segment between two points (described later) at which correction is performed in a relationship between the theoretical divided voltage TH_a and the theoretical temperature TH_b (see FIG. 5), and is a slope obtained by linear first-order approximation of the segment between the two points.

Figure 5:
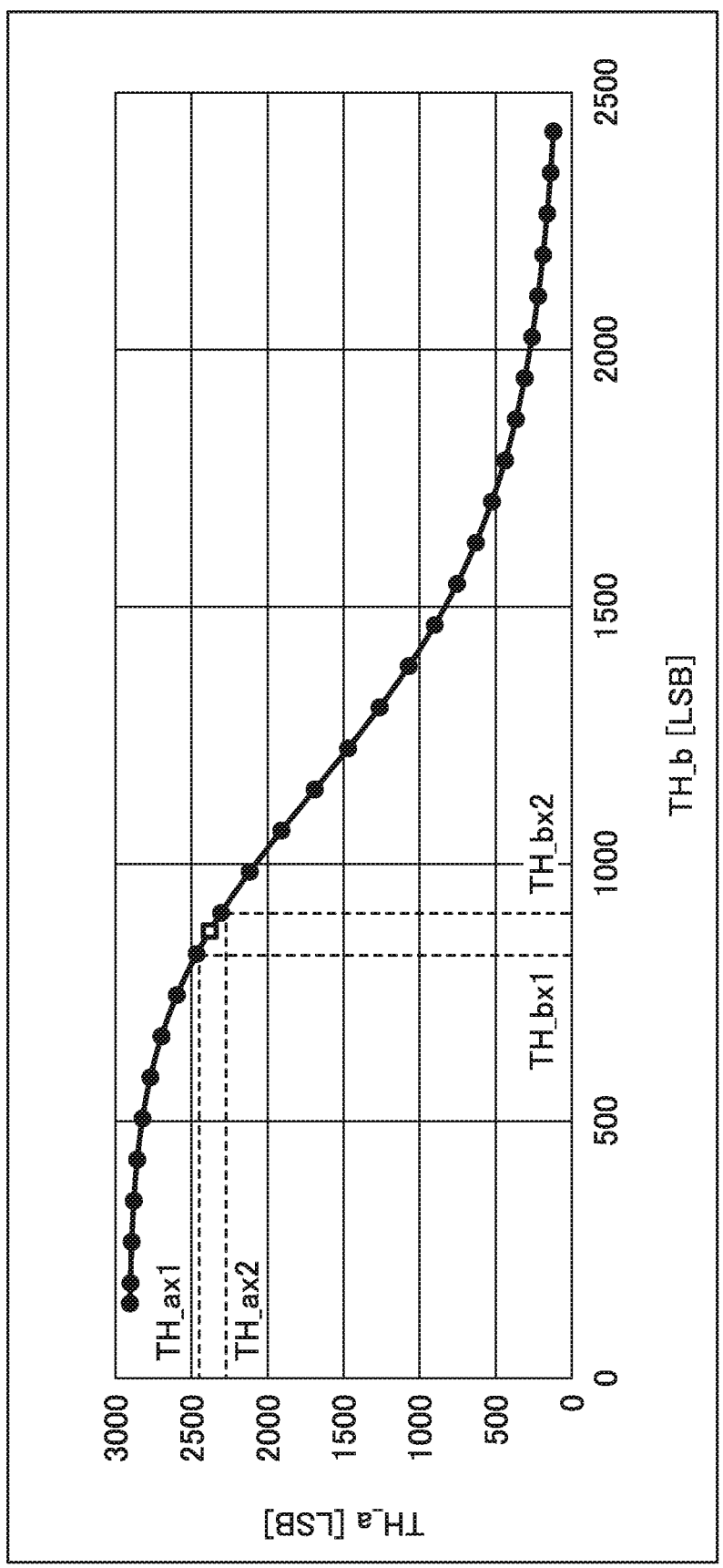
FIG. 5 is a chart illustrating an example of a relationship between a theoretical divided voltage TH_ax and a theoretical temperature TH_bx.

FIG. 5 is a chart illustrating an example of the relationship between the theoretical divided voltage TH_a and the theoretical temperature TH_b. The horizontal axis in FIG. 5 indicates TH_b (corresponding to the temperature of the thermistor 100), and the vertical axis in FIG. 5 indicates TH_a (corresponding to the divided voltage). Further, a slope between two points of the curved line in FIG. 5 is TH_c.

For example, in FIG. 5, the slope TH_c between TH_bx1, at which the thermistor temperature Tntc is x1, and TH_bx2, at which the thermistor temperature Tntc is x2, can be obtained by the following expression (6):

$$TH\_c=(TH\_ax2-TH\_ax1)/(TH\_bx1-TH\_bx2) \quad (6),$$

where TH_ax1 is the theoretical divided voltage TH_a corresponding to TH_bx1, and TH_ax2 is the theoretical divided voltage TH_a corresponding to TH_bx2.

In FIG. 5, for example, on the low temperature side of TH_b, the resistance value Rntc of the thermistor 100 is great, and thus TH_a (divided voltage) obtained by the expression (5) is close to the maximum. Meanwhile, on the high temperature side thereof, the resistance value Rntc is small, and thus TH_a obtained by the expression (5) is close to the minimum.

Further, FIG. 6 is an explanatory chart of the correction coefficient table.

For each chip temperature Ti of the integrated circuit 10 (semiconductor chip), the correction coefficient table includes information I1 indicating a relationship between the thermistor temperature Tntc of the thermistor 100 and the divided voltage (theoretical divided voltage TH_a) of the voltage divider circuit and the slope TH_c at the corresponding thermistor temperature. Note that the above-mentioned information I1 corresponds to "first information" and corresponds to information in a row of the correction coefficient table in FIG. 6. Further, the correction coefficient table corresponds to a "table".

In each correction coefficient table, TH_a and TH_c are each associated with the chip temperature Ti and the thermistor temperature Tntc (Tj). As the chip temperature Ti, multiple values are set at predetermined intervals from the minimum value T1 to the maximum value Tx. Further, the thermistor temperature Tntc (Tj) corresponds to the theoretical temperature TH_b in FIG. 5, and multiple values are set at predetermined intervals from the minimum value T1 to the maximum value Ty. For example, TH_a (T1, Tj) in the center of the table in FIG. 6 indicates the theoretical divided voltage TH_a when the chip temperature is Ti and the thermistor temperature is Tj, and TH_c (Ti, Tj) therein indicates the slope TH_c when the chip temperature is Ti and the thermistor temperature is Tj.

As illustrated in FIG. 6, the measurement device (or an external computer and the like) of an embodiment of the present disclosure creates multiple (in this case, three) correction coefficient tables corresponding to the sheet resistances (ρs ratios), respectively. Note that the number of the correction coefficient tables may be more than three. The created correction coefficient tables are then stored in the dedicated address of the storage circuit 17 (S105).

<<Process of Detecting Temperature of Thermistor 100>>

Figure 7:
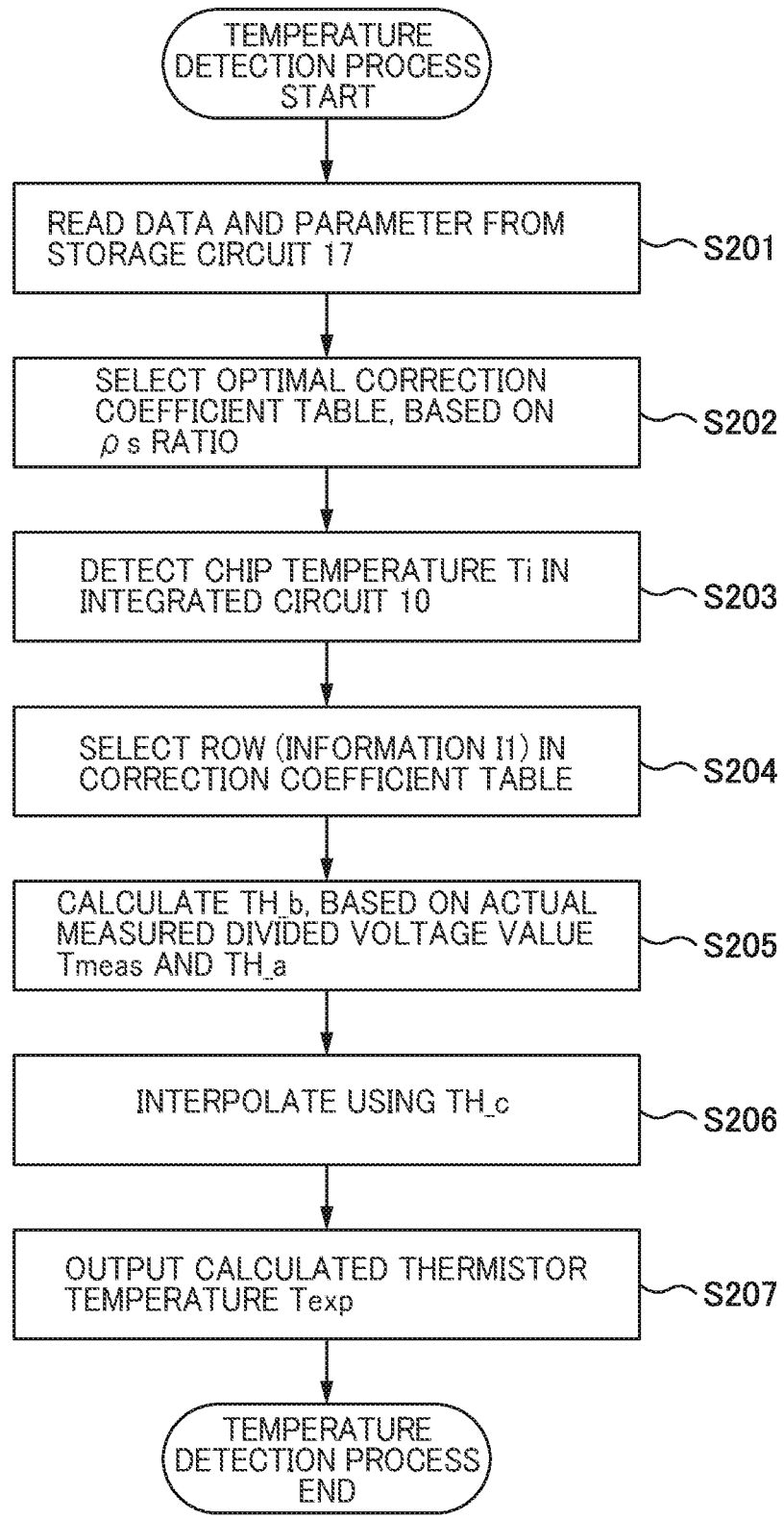
FIG. 7 is a flowchart illustrating a temperature detection process by a thermistor 100.

Next, a description will be given of a process of detecting the temperature of the thermistor 100 in the configuration of FIG. 1. FIG. 7 is a flowchart illustrating the process of detecting the temperature of the thermistor 100.

First, the arithmetic circuit 16 reads the data of the semiconductor device 1 (resistance value, ρs ratio, and so on), the parameters (α, β, γ, and so on), and the correction coefficient table stored in the storage circuit 17 (S201).

The arithmetic circuit 16 then selects an optimal correction coefficient table, based on the read ρs ratio (S202). For example, when the read ρs ratio is 0.95, that is, when the ρs ratio is between 0.85 and 1.0 and a difference from 1.0 is smaller than a difference from 0.85 (that is, close to 1.0), the arithmetic circuit 16 selects the middle correction coefficient table in FIG. 6 (ρs ratio=1.0).

Next, the temperature detection circuit 13 detects the chip temperature Ti in the integrated circuit 10, based on the forward voltages of the diodes D1 to Dn (S203). Based on this chip temperature Ti, the arithmetic circuit 16 determines a row in the correction coefficient table of the ρs ratio being 1.0 in FIG. 6 (S204). Based on the information I1 in the determined row, the relationship as illustrated in FIG. 5 is obtained.

Next, the arithmetic circuit 16 calculates the theoretical temperature TH_b, based on an actual measured divided voltage value Tmeas and the theoretical value (theoretical divided voltage TH_a) (S205). Note that, in FIG. 5, the actual measured divided voltage value Tmeas (digital value) is indicated by an open square. In this process, for example, the actual measured values Tmeas and the theoretical divided voltages TH_a are sequentially compared from the lower side of temperature (smaller side of TH_b value), to detect a part where TH_a<Tmeas. In contrast, the actual measured values Tmeas and the theoretical divided voltages TH_a may be sequentially compared from the higher side of temperature (greater side of TH_b value), to detect a part where TH_a>Tmeas.

In a case of FIG. 5, TH_ax1 is greater than Tmeas, and TH_ax2 is smaller than Tmeas. Therefore, the arithmetic circuit 16 detects that Tmeas is between the two points of TH_ax1 and TH_ax2 (between TH_bx1 and TH_bx2).

The arithmetic circuit 16 then interpolates the segment between the two points by using the corresponding slope TH_c (S206).

Specifically, a correction value Texp of the temperature of the thermistor 100 is obtained by the following expression (7):

$$Texp=(TH\_ax1-Tmeas) \times TH\_cx + TH\_bx1 \quad (7),$$

where Texp is the thermistor temperature Tntc of the thermistor 100 obtained by correction.

The arithmetic circuit 16 then outputs the calculated temperature of the thermistor 100 (in an embodiment of the present disclosure, the temperature near the engine) to the outside (for example, the ECU) through the terminal T5 (S207).

With the above-described process, it is possible to accurately detect the temperature of the thermistor 100 provided in a place away from the semiconductor device 1.

<<Modifications of Resistor 21 and Resistor 22>>

Multiple resistors 21 and multiple resistors 22 may be provided. Further, the multiple resistors 21 and the multiple resistors 22 may be selectively coupled to the node N1 (in other words, the terminal T3).

Figure 8A:
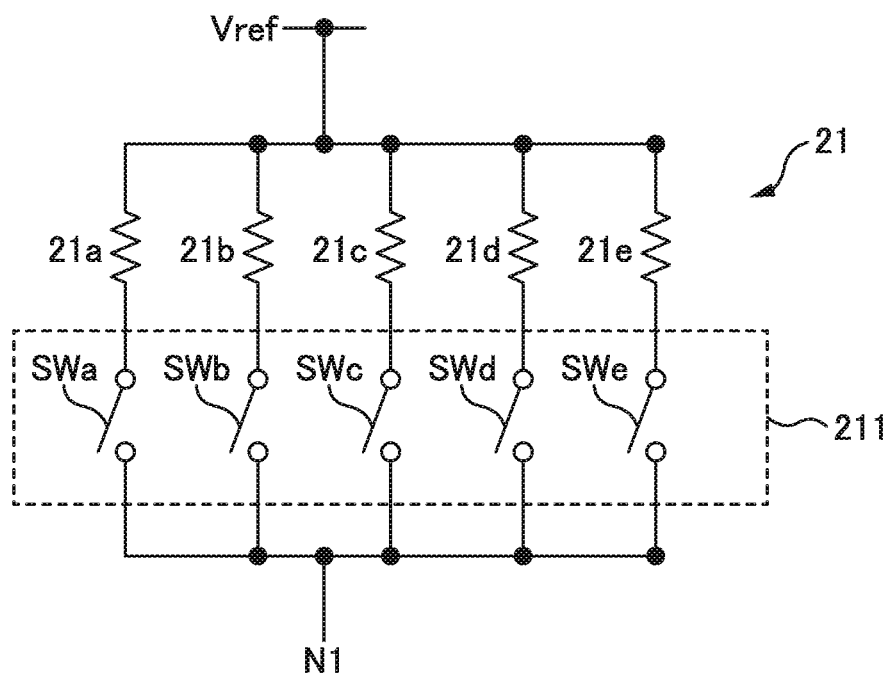
FIG. 8A is a diagram illustrating a modification of a resistor 21.
Figure 8B:
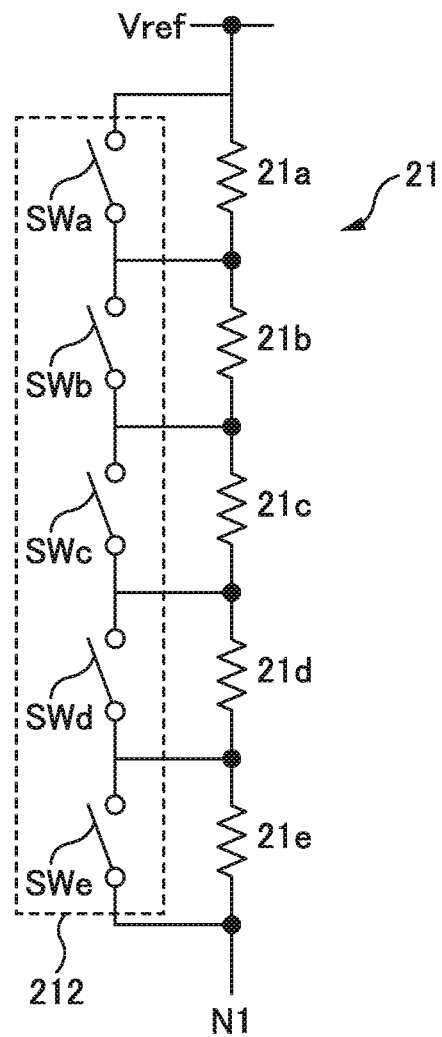
FIG. 8B is a diagram illustrating another modification of the resistor 21.

FIG. 8A is a diagram illustrating a modification of the resistor 21. Further, FIG. 8B is a diagram illustrating another modification of the resistor 21. Note that, although the modification of the resistor 21 is described here, the same or similar configuration can also be applied to the resistor 22.

The resistor 21 in FIG. 8A includes resistors 21a to 21e that have different resistance values, and are coupled in parallel. Further, switches SWa to SWe are each provided between the corresponding one of the resistors 21a to 21e and the node N1. The switches SWa to SWe configure a switching circuit 211 configured to switch the resistor(s) to be coupled to the node N1 (terminal T3). The switches SWa to SWe of the switching circuit 211 are selectively turned on and off, thereby being able to selectively couple the resistors 21a to 21e to the node N1, so that the resistance value can be changed. Note that the switches SWa to SWe may be configured with MOS transistors, for example. However, since an ON resistance of the MOS transistor can cause variations, it is needed to design such that the ON resistance is sufficiently smaller than the resistance value of each resistor.

The resistor 21 in FIG. 8B includes the resistors 21a to 21e coupled in series. Further, the switches SWa to SWe are provided in parallel to the resistors 21a to 21e, respectively. The switches SWa to SWe configure a switching circuit 212. In this case as well, it is possible to change the resistance value by selectively turning on and off the switches SWa to SWe of the switching circuit 212.

Second Embodiment

Figure 9:
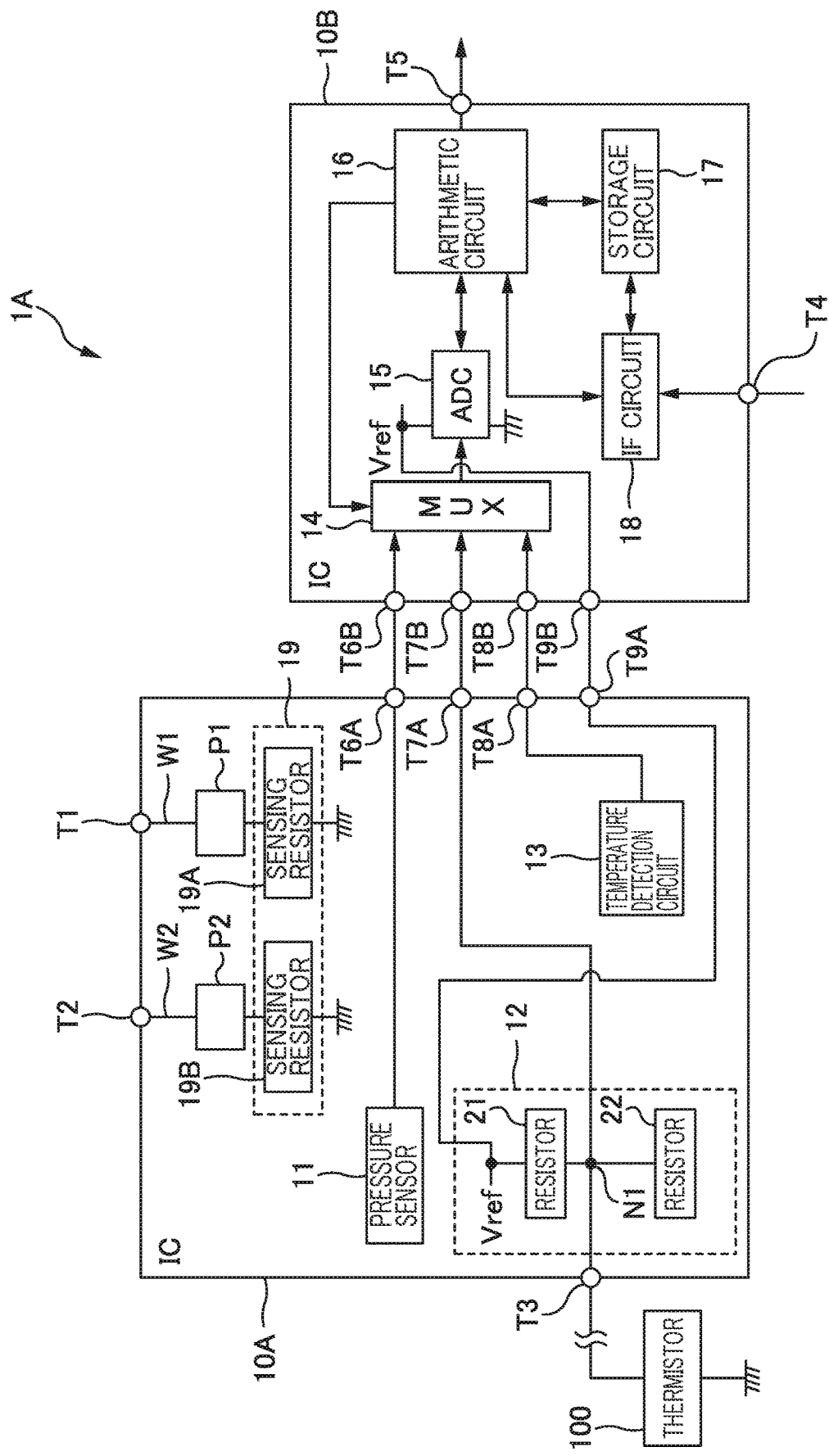
FIG. 9 is an explanatory diagram of an entire configuration including a semiconductor device 1A of a second embodiment.

FIG. 9 is an explanatory diagram of an entire configuration including a semiconductor device 1A of a second embodiment.

The semiconductor device 1A of the second embodiment includes an integrated circuit 10A and an integrated circuit 10B.

The integrated circuit 10A includes the pressure sensor 11, the resistor circuit 12, the temperature detection circuit 13, the sheet resistance measurement pattern 19 (sensing resistors 19A and 19B), the pads P1 and P2, the terminals T1 to T3, and terminals T6A, T7A, T8A, and T9A. Note that the integrated circuit 10A corresponds to a "first integrated circuit". The pressure sensor 11 and a terminal T6B of the integrated circuit 10B are coupled to the terminal T6A. The node N1 of the resistor circuit 12 and a terminal T7B of the integrated circuit 10B are coupled to the terminal T7A. The temperature detection circuit 13 and a terminal T8B of the integrated circuit 10B are coupled to the terminal T8A. The reference voltage Vref and a terminal T9B of the integrated circuit 10B are coupled to the terminal T9A.

The integrated circuit 10B includes the MUX 14, the ADC 15, the arithmetic circuit 16, the storage circuit 17, the IF circuit 18, the terminals T4 and T5, and terminals T6B, T7B, T8B, and T9B. Note that the integrated circuit 10B corresponds to a "second integrated circuit". The output from the pressure sensor 11 is inputted to the MUX 14 through the terminals T6A and T6B. Further, the divided voltage of the resistor circuit 12 (voltage at the node N1) is inputted to the MUX 14 through the terminals T7A and T7B. Moreover, a detection result from the temperature detection circuit 13 is inputted to the MUX 14 through the terminals T8A and T8B. Furthermore, the reference voltage Vref of the integrated circuit 10A is inputted as the reference voltage of the ADC 15 through the terminals T9A and T9B.

Further, the thermistor 100 provided in a place away from the semiconductor device 1A is coupled to the terminal T3 of the integrated circuit 10A.

The second embodiment is different from the first embodiment only in that the circuits and the elements configuring the semiconductor device 1 of the first embodiment are arranged in the two integrated circuits 10A and 10B (two IC chips), and the operations and the like of the circuits are similar to those in the first embodiment. Thus, detailed descriptions thereof are omitted. As with the first embodiment, it is possible to accurately detect the temperature of the thermistor 100, in the second embodiment as well.

SUMMARY

The semiconductor device 1 of an embodiment of the present disclosure has been described above.

The integrated circuit 10 included in the semiconductor device 1 includes the terminal T3, the resistor 21, the sensing resistors 19A and 19B, the temperature detection circuit 13, the storage circuit 17, and the arithmetic circuit 16. The thermistor 100 provided outside the semiconductor device 1 is coupled to the terminal T3. The resistor 21 is coupled in series with the thermistor 100 through the terminal T3, to configure the voltage divider circuit. The sensing resistors 19A and 19B are resistors for detecting sheet resistance that have the same attribute (polysilicon) as that of the resistor 21. The temperature detection circuit 13 detects the chip temperature Ti of the integrated circuit 10. The storage circuit 17 stores the correction coefficient table including the information I1 for each of the multiple chip temperatures Ti, the information I1 corresponding to the sheet resistance of the resistor 21 obtained based on the result of measurement of the sensing resistors 19A and 19B and indicating the relationship between the thermistor temperature Tntc of the thermistor 100 and the divided voltage (theoretical divided voltage TH_a) of the voltage divider circuit at the thermistor temperature Tntc. Further, the arithmetic circuit 16 obtains the thermistor temperature Tntc of the thermistor 100, based on the above-mentioned information I1 at the chip temperature Ti detected by the temperature detection circuit 13 and the divided voltage of the voltage divider circuit (theoretical divided voltage TH_a).

This makes it possible to accurately detect the thermistor temperature Tntc of the thermistor 100 provided in a place away from the semiconductor device 1.

Further, the storage circuit 17 stores the correction coefficient table for each of the multiple sheet resistances ρs, and the arithmetic circuit 16 selects the correction coefficient table corresponding to the sheet resistance ρs detected by the sensing resistors 19A and 19B from among the multiple correction coefficient tables.

This makes it possible to detect the thermistor temperature Tntc of the thermistor 100 with higher accuracy.

Moreover, the temperature detection circuit 13 detects the temperature of the integrated circuit 10, based on the temperature characteristics of the forward voltages Vf of the diodes D1 to Dn.

This makes it possible to detect the chip temperature Ti, based on the forward voltage of the diode. Further, this makes it possible to enhance the temperature detection sensitivity by forming the multiple diodes in multiple stages.

Furthermore, the above-mentioned voltage divider circuit includes the resistor 22 that is coupled in series with the resistor 21 and is coupled in parallel with the thermistor 100 through the terminal T3.

This makes it possible to further enhance the temperature detection accuracy.

Further, the resistor 21 and the resistor 22 are made of polysilicon.

This stabilize the resistance value, and the resistance value is less likely to be affected by bias.

Moreover, the modifications in FIGS. 8A and 8B include the switching circuits 211 and 212 (the switches SWa to SWe) configured to selectively couple the multiple (specifically, five) resistors 21a to 21e to the node N1 (in other words, the terminal T3). The same or similar configuration may be applied to the resistor 22.

This makes it possible to switch the resistance value of the resistor 21 (and the resistor 22) to a desirable value.

Furthermore, the integrated circuit 10 (specifically, the semiconductor substrate) includes the pads P1 and P2 configured to measure the resistances of the sensing resistors 19A and 19B, respectively.

This makes it possible to measure (detect) the sheet resistance ρs in the wafer testing.

Further, the storage circuit 17 stores the information indicating the manufacturing conditions of the integrated circuit 10 (lot No, wafer No, chip coordinates, and the like).

This makes it possible to grasp the conditions in the semiconductor chip manufacturing of the integrated circuit 10.

Moreover, the semiconductor device 1A of the second embodiment includes the integrated circuit 10A and the integrated circuit 10B. The Integrated circuit 10A includes the pressure sensor 11, the resistor circuit 12, the temperature detection circuit 13, the sheet resistance measurement pattern 19 (sensing resistors 19A and 19B), the pads P1 and P2, and the terminals T1 to T3. Further, the integrated circuit 10B includes the MUX 14, the ADC 15, the arithmetic circuit 16, the storage circuit 17, the IF circuit 18, and the terminals T4 and T5.

Even in a case of being divided into two chips as described above, it is still possible to accurately detect the temperature of the thermistor 100 provided in a distant place.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

The temperature detection circuit 13 of an embodiment of the present disclosure described above detects the temperature, based on the temperature-dependent characteristics of the forward voltages of the diodes D1 to Dn; however, it is not limited thereto. For example, the temperature may be detected by using a proportional-to-absolute-temperature (PTAT) current circuit configured to generate a constant current proportional to an absolute temperature.

In an embodiment of the present disclosure described above, the resistor circuit 12 includes the resistors 21 and 22 coupled in series; however, it is not limited thereto, and, for example, the thermistor 100 may be coupled in series with the resistor 21 through the terminal T3 without providing the resistor 22. In this case, a voltage divider circuit is configured with the thermistor 100 and the resistor 21. In this case as well, it is possible to accurately detect the temperature of the thermistor 100 by performing the same or similar process.

In an embodiment of the present disclosure described above, the multiple correction coefficient tables are stored in the storage circuit 17; however, the correction coefficient table corresponding to the ρs ratio obtained in the wafer testing may be stored in the storage circuit 17. In this case, different correction coefficient tables are stored for respective chips (integrated circuits 10). This negates the need for the process of selecting the correction coefficient table (step S202 in FIG. 7).

The present disclosure is directed to provision of a semiconductor device capable of accurately detecting a temperature of a distant place.

According to the present disclosure, it is possible to provide a semiconductor device capable of accurately detecting a temperature of a distant place.

What is claimed is:
1. A semiconductor device configured to be coupled to a temperature detection element, the semiconductor device comprising:
   an integrated circuit, including:

a terminal through which the temperature detection element is coupled, a first resistor coupled to the terminal, such that the first resistor is coupled in series with the temperature detection element through the terminal to thereby configure a voltage divider circuit for providing a divided voltage, a sensing resistor configured to measure a sheet resistance, the sensing resistor having a same attribute as an attribute of the first resistor, a temperature detection circuit configured to detect a value of a first temperature that is a temperature of the integrated circuit, a storage circuit configured to store a table including first information for each of a plurality of values of the first temperature, the plurality of values including the value of the first temperature detected by the temperature detection circuit, the first information corresponding to the sheet resistance of the first resistor obtained from a result of measurement of the sensing resistor, and indicating a relationship between a second temperature, which is a temperature of the temperature detection element, and the divided voltage at the second temperature, and an arithmetic circuit configured to obtain the second temperature, based on the first information for the value of the first temperature detected by the temperature detection circuit and the divided voltage of the voltage divider circuit.

2. The semiconductor device according to claim 1, wherein
the storage circuit stores a plurality of tables respectively for a plurality of sheet resistances, the plurality of tables including said table for said sheet resistance, and
the arithmetic circuit selects one of the plurality of tables corresponding to the sheet resistance detected by the sensing resistor.

3. The semiconductor device according to claim 1, wherein
the temperature detection circuit includes a diode, and detects the value of the first temperature based on a temperature characteristic of a forward voltage of the diode.

4. The semiconductor device according to claim 1, wherein
the voltage divider circuit further includes a second resistor that is coupled in series with the first resistor and that is coupled in parallel with the temperature detection element through the terminal.

5. The semiconductor device according to claim 4, wherein
the first resistor and the second resistor are made of polysilicon.

6. The semiconductor device according to claim 4, wherein
the first resistor includes a plurality of first resistors, and the second resistor includes a plurality of second resistors,
the semiconductor device further includes a switching circuit configured to selectively couple the plurality of first resistors and the plurality of second resistors to the terminal.

7. The semiconductor device according to claim 1, further comprising:
a pad coupled to the sensing resistor, a resistance of the sensing resistor being measurable through the pad.

8. The semiconductor device according to claim 1, wherein
the storage circuit further stores second information indicating a manufacturing condition of the integrated circuit.

9. A semiconductor device configured to be coupled to a temperature detection element, the semiconductor device comprising:
a first integrated circuit and a second integrated circuit, wherein
the first integrated circuit includes:
a terminal through which the temperature detection element is coupled,
a first resistor coupled to the terminal, such that the first resistor is coupled in series with the temperature detection element to thereby configure a voltage divider circuit for providing a divided voltage,
a sensing resistor configured to measure a sheet resistance, the sensing resistor having a same attribute as an attribute of the first resistor, and
a temperature detection circuit configured to detect a value of a first temperature that is a temperature of the first integrated circuit; and
the second integrated circuit includes:
a storage circuit configured to store a table including first information for each of a plurality of values of the first temperature, the plurality of values including the value of the first temperature detected by the temperature detection circuit, the first information corresponding to the sheet resistance of the first resistor obtained from a result of measurement of the sensing resistor, and indicating a relationship between a second temperature, which is a temperature of the temperature detection element, and the divided voltage at the second temperature, and
an arithmetic circuit configured to obtain the second temperature, based on the first information for the value of the first temperature detected by the temperature detection circuit and the divided voltage of the voltage divider circuit.

* * * * *